United States Patent
Goodnow et al.

[19]

[11] Patent Number: 6,167,524

[45] Date of Patent: Dec. 26, 2000

[54] APPARATUS AND METHOD FOR EFFICIENT BATTERY UTILIZATION IN PORTABLE PERSONAL COMPUTERS

[75] Inventors: Kenneth J. Goodnow, South Burlington, Vt.; Michel S. Michail, Poughkeepsie, N.Y.; Janak G. Patel, South Burlington, Vt.; Wilbur D. Pricer, Charlotte, Vt.; Sebastian T. Ventrone, South Burlington, Vt.

[73] Assignee: International Business Machines Corporation, Armonk, N.Y.

[21] Appl. No.: 09/056,300

[22] Filed: Apr. 6, 1998

[51] Int. Cl.[7] .............................. G06F 1/26; G06F 1/28; G06F 1/30

[52] U.S. Cl. .................... 713/300; 713/320; 713/340; 713/322; 713/323; 713/330; 713/501

[58] Field of Search ................................ 713/300, 320, 713/340, 322, 323, 330, 501

[56] References Cited

U.S. PATENT DOCUMENTS

| | | | |
|---|---|---|---|
| 5,021,983 | 6/1991 | Nguyen et al. | 713/321 |
| 5,189,647 | 2/1993 | Suzuki et al. | 368/10 |
| 5,388,265 | 2/1995 | Volk | 713/300 |
| 5,517,649 | 5/1996 | McLean | 713/300 |
| 5,584,031 | 12/1996 | Burch et al. | 713/323 |
| 5,630,143 | 5/1997 | Maher et al. | 713/310 |
| 5,630,148 | 5/1997 | Norris | 713/322 |
| 5,726,921 | 3/1998 | Krick | 713/321 |
| 5,815,724 | 9/1998 | Mates | 713/322 |
| 5,842,027 | 11/1998 | Oprescu et al. | 713/300 |
| 5,870,616 | 2/1999 | Loper et al. | 713/323 |
| 5,991,884 | 9/1998 | Lin et al. | 713/300 |

FOREIGN PATENT DOCUMENTS 0 750 248 A2 12/1996 United Kingdom .
WO 95/31029 11/1995 WIPO .

OTHER PUBLICATIONS

IBM Technical Disclosures Bulletin, "Technique for Monitoring a Computer System's Activity for the Purpose of Power Management of a DOS–Compatible System", vol. 33, No. 4, Sep. 1990.

IBM Technical Disclosure Bulletin, "Techniques for Power Management in Signal Processors", vol. 35, No. 5, Oct. 1992.

IBM Technical Disclosure Bulletin, Power Management Mechanism for Personal Computers, vol. 38, No. 4, Apr. 1995.

IBM Technical Disclosure Bulletin, "Method to Detect and Correct a Missing Halt Instruction", vol. 38, No. 04, Apr. 1995.

*Primary Examiner*—Ayaz R. Sheikh
*Assistant Examiner*—Frantz Blanchard Jean
*Attorney, Agent, or Firm*—DeLio & Peterson, LLC; Robert Curcio; Eugene I. Shkurko

[57] ABSTRACT

An apparatus and method controlling power consumption in portable personal computers by dynamically allocating power to the system logic. Expected total power consumption is calculated and compared to an optimum power efficiency value. The expected power consumption values for each execution unit are stored in a look-up table in actual or compressed form. If the expected total power consumption value exceeds the power efficiency value, selected execution units are made inactive. Conversely, if the power efficiency value exceeds the expected total power consumption value, execution unit functions are added in order to maintain a level current demand on the battery.

30 Claims, 3 Drawing Sheets

APPARATUS AND METHOD FOR EFFICIENT BATTERY UTILIZATION IN PORTABLE PERSONAL COMPUTERS

BACKGROUND OF THE INVENTION

1. Field of the Invention

The present invention pertains to the field of computer systems. More particularly, this invention relates to power management of a portable computer system.

2. Description of Related Art

The conservation of power remains particularly important in portable electronic devices. Laptop and notebook computers are typically designed for use with batteries, away from power outlets. Most battery packs can only power a computer for a few hours of continuous use. Therefore, portable personal computers need to be designed for very low power operation in order to conserve the limited charge of the battery. For this same reason, portable personal computers should also be designed for maximum efficiency with respect to how power is drawn from the battery.

The battery normally supplies power to the microprocessor through a dc-to-dc converter. At very low currents, the power efficiency of the dc-to-dc converter is low. At very high currents, the power efficiency of both the battery and the dc-to-dc converter is low. Thus, for maximum power efficiency, power needs to be drawn from the battery at intermediate and moderate levels whenever there is a substantial queue of useful computation to be done.

Typically, portable computer systems provide a variety of mechanisms for minimizing the electrical current consumption during computer operation. For example, systems usually implement sleep modes and standby modes for input/output devices. The largest consumer of power in a portable computer is the display. One way the prior art has implemented power conservation is by disabling the power to the display when it is not in use.

Another consumer of power is the microprocessor and its motherboard. The microprocessors used in portable computers are derived from microprocessors designed originally for desktop computers, where power consumption was not as important. In the prior art, computer manufacturers have merely reduced the supply voltage and clock rate of a microprocessor to make it suitable for portable use. The frequency of the microprocessor clock determines the rate at which the processor fetches and executes instructions. Reducing this clock rate reduces the number of executable instructions (node toggles) processed and the corresponding current draw necessary to implement them.

In U.S. Pat. No. 5,630,143 issued to Maher, et al., on May 13, 1997, entitled "MICROPROCESSOR WITH EXTERNALLY CONTROLLABLE POWER MANAGEMENT", the microprocessor clock signals are disabled and enabled by a control signal. By suspending the clocks to the core circuitry and memory circuitry, a significant reduction in the power consumed by the microprocessor is realized. The operation of the microprocessor may also be suspended, responsive to a software command for devices that support a HALT command or similar executable function.

In U.S. Pat. No. 5,189,647 issued to Suzuki et al., on Feb. 23, 1993, entitled "INFORMATION PROCESSING SYSTEM HAVING POWER SAVING CONTROL OF THE PROCESSOR CLOCK", the frequency of the clock signal is reduced rather than having the clock to the processor completely stopped.

Similarly, in U.S. Pat. No. 5,630,148 issued to Norris on May 13, 1997, entitled, "DYNAMIC PROCESSOR PERFORMANCE AND POWER MANAGEMENT IN A COMPUTER SYSTEM", the processor executes a performance manager program that writes to a clock speed register according to a performance state selected by an application program. A performance state table, maintained by the performance manager program, stores a set of clock frequencies that correspond to a set of performance states for the processor. The application program selects the performance state to maximize performance during processor intensive functions and to maximize power conservation during interactive functions.

Another method of power conservation is to have the microprocessor system enter the power management mode by an optimal time out value, as taught in European Patent No. EP 0 750 248 A2, issued to Kawano, et al., on Jun. 6, 1996, entitled, "AN INFORMATION PROCESSING SYSTEM HAVING A POWER SAVING FUNCTION AND A CONTROL METHOD THEREFOR". In Kawano, power consumption is reduced in response to a timer indicating that a predetermined time has elapsed since the last operation. Once a time out has occurred, the system is arranged to change between its normal modes of operation and a power management mode. The personal computer system is then able to perform such power management operations as LCD-off (liquid crystal display off), HDD-off (hard disc drive off), and a Suspend/HALT operation.

Recent advances in microprocessor design have complicated the power problem for portable computers. Today, super pipeline processors have the ability to run many speculative operation codes (opcodes) in order to improve the overall performance of the processor. However, this speculative function can also adversely affect power consumption. If on the average, five to seven execute cycles are running, with an effective performance improvement of less than 50%, the ratio of executed functions versus power consumption will not be linear, i.e., multiple execution units operating consecutively will not correspond to a one-for-one increase in performance. This non-linear improvement in performance will consume considerably more power. Thus, at times, speculative execution may not be warranted.

If, however, one wants to dynamically manage the power consumption inside battery powered portable computers, some form of power management of execution or power consumption allocation is desirable. In particular, speculative execution units may be monitored and curtailed whenever the current drain on the battery is outside the range of maximum battery conversion efficiency. Additionally, by maintaining a constant load on the battery, battery life may be extended.

Power analysis tools currently exist to calculate the power consumption of an execution unit when its nodes toggle. The number of node toggles depends on the function being executed. The ability to control the dynamic execution of logic to conserve power is taught by the present invention. This allows power allocation to be based on current system needs and program execution.

Bearing in mind the problems and deficiencies of the prior art, it is therefore an object of the present invention to manage a balance between performance and power consumption in a computer system.

It is another object of the present invention to provide a portable, battery powered computer system with improved power conservation.

A further object of the invention is to increase battery life by maintaining a constant load on the battery during operation.

It is another object of the present invention to dynamically allocate power to the system logic circuitry.

Another object of the present invention is to monitor active execution units including determining an expected total power consumption value based on the measured power allocation attributed to each execution unit performed.

It is yet another object of the present invention to compare the expected total power consumption value to a power efficiency value associated with the optimum battery output.

A further object of the present invention is to cancel selected execution unit activities whenever the expected total power consumption value exceeds the power efficiency value.

Another object of the present invention is to add executable unit activities to sustain the expected total power consumption value within the range of maximum battery conversion efficiency.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, an apparatus for controlling power consumption of a computer system having a plurality of execution units comprising a means for: storing and retrieving a power efficiency value, and expected power consumption values corresponding to the plurality of execution units when the execution units are active; determining which of the execution units are currently active; determining an approximate expected total power consumption value; comparing the expected total power consumption value to the power efficiency value; and, canceling operation of the active execution units responsive to the means for comparing, to control power consumption of the computer system.

The means for canceling comprises canceling operation of the active execution units such that the expected total power consumption does not substantially exceed the power efficiency value.

The above described apparatus is also capable of adding executable operation codes to the execution units such that the expected total power consumption is sustained at approximately the power efficiency value. The adding of execution operation codes comprises, in part, adding nonsense operation codes to the execution units.

Additionally, the present invention is capable of canceling and adding executable operation codes to the execution units such that the expected total power consumption approximately remains at the power efficiency value.

Further, the apparatus provides for canceling operation of the active execution units by providing a means for determining which execution units are speculative and canceling the speculative execution units.

The apparatus provides the means for determining the approximate expected total power consumption value by summing the expected power consumption values corresponding to each of the active execution units.

Lastly, the apparatus provides the means for storing and retrieving the expected power consumption values in a look-up table.

In a second aspect, an apparatus of the present invention controls power consumption of a computer system that has a plurality of execution units comprising:

- a memory storage device, the memory device being adapted to store a power efficiency value, and expected power consumption values corresponding to the plurality of execution units;
- a processor comprising a controller element, a power allocation control element, and a programmable register, and having connections to the memory storage device, the processor being adapted to determine which of the execution units are active, determine an approximate expected total power consumption value corresponding to the plurality of execution units when the execution units are active, and compare the expected total power consumption value to the power efficiency value;
- the controller element of the processor being connected to and accessible by the power allocation control element, and having connections to monitor each of the execution units, the controller element being adapted to collect the expected power consumption values and cancel operation of active execution units;
- the power allocation control element of the processor being connected to the controller and the programmable register, the power allocation control element being adapted to receive input data from execution units, power allocation level information from the programmable register, and expected power consumption values, and sum the total value of all expected power consumption values corresponding to active execution units to determine if power allocation based on optimum battery efficiency has been exceeded; and,
- the programmable register of the processor being connected to the power allocation control element, wherein the register is adapted to set the level of power allocation.

In another aspect, the present invention is directed to a method of controlling power consumption of a computer system having a plurality of execution units comprising:

storing and retrieving a power efficiency value, and expected power consumption values corresponding to the plurality of execution units when the execution units are active;

determining which of the execution units are currently active;

determining an approximate expected total power consumption value;

comparing the expected total power consumption value to the power efficiency value; and, canceling operation of one or more of the active execution units responsive to the comparison of the expected total power consumption value to the power efficiency value.

The canceling operation comprises canceling one or more of the active execution units when the expected total power consumption value substantially exceeds the power efficiency value.

The method of the present invention also includes adding executable operation codes to the execution units such that the expected total power consumption is sustained at approximately the power efficiency value. The adding of execution operation codes comprises, in part, adding nonsense operation codes to the execution units.

Additionally, the method further consists of canceling and adding executable operation codes to the execution units such that the expected total power consumption approximately remains at the power efficiency value.

The method provides for determining the approximate expected total power consumption value by summing the expected power consumption values corresponding to each of the active execution units.

Further, the method includes canceling operation of the active execution units by determining which execution units are speculative and canceling the speculative execution units.

The method stores and retrieve the expected power consumption values in a look-up table. The method of storing and retrieving the expected power consumption values further comprises using a compressed form look-up table of the total number of node toggles for the execution units.

The method of retrieving the look-up table compressed form comprises retrieving an organized distribution of a small number of values for grouping the total number of node toggles for the execution units.

Lastly, the method of retrieving the look-up table compressed form comprises retrieving the organized distribution of a small number of values wherein the values are in a range with limits based on multiples of two (2).

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–4 of the drawings in which like numerals refer to like features of the invention.

Figure 1:
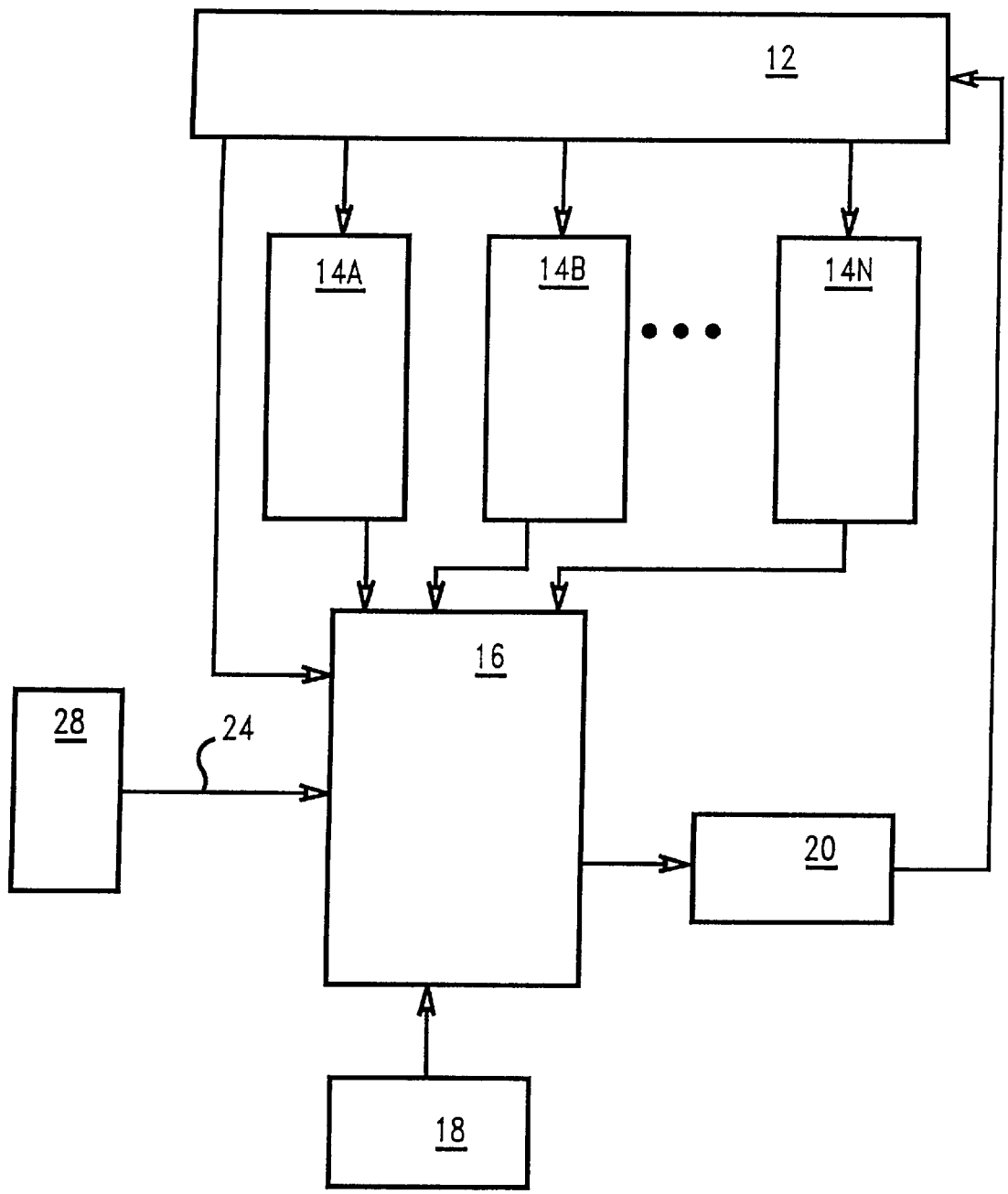
FIG. 1 is a control flow diagram of the power conservation algorithm.

FIG. 1 illustrates the control flow diagram of the present invention. A master programmable power allocation register 18 sets the level of power allocation for the system. A power allocation control unit 16 receives data on the power level and power consumption of various execution units from a look-up table data base stored in the system, along with the active status of each execution unit currently operating. Based on the approximate expected power consumption values received for activated execution units, the power allocation control unit rations the use of execution units or solicits the implementation of additional executable code instructions, whichever is necessary to maintain a consistent load for the system's power source. A controller element 12 then determines and controls which executable functions are to be performed on the next cycle.

Expected power consumption values are approximated and assigned for a plurality of execution units 14A, 14B . . . 14n. These values are based on the total number of node toggles for each execution unit. The number of node toggles depends upon the execution unit being activated. During the design phase, a data base is created for the average toggling power associated with each execution unit 14A, 14B . . . 14n. The data base is typically calculated by running application codes with a physical capacitance based simulation tool that will measure the power consumed per cycle for each execution unit. This data base computation is a comprehensive analysis similar to Boolean checking. Then, either the expected power consumption values or the total number of node toggles per execution unit is saved in a look-up table.

Once the expected power consumption value look-up table is developed, it is inputted to memory storage device 28 for later retrieval. Information from the look-up table is accessed by the power allocation control unit 16 through signal lines 24. See FIG. 1.

In order to save table size, the expected power consumption values may be organized into discrete bins associated with corresponding integer values such that each grouping of node toggle counts is assigned to an individual integer value. For example, execution units with node toggle counts in the range of 0 to 3000 would be assigned an integer value of one (1), while execution units with node toggle counts in the range of 3001 to 6000 would be assigned an integer value two (2), etc. The actual assignment of node toggle counts may vary; the values above are given as an illustrative example of such an assignment. Additionally, integer values may be identified in a base two format, e.g., 0 to $2^3$, 0 to $2^4$, etc. Hence, a look-up table, simply consisting of discrete integers, would be compact and quick to respond to inquiry with an appropriate scaled value of approximate expected power consumption value ranges.

Whenever the processor control logic activates execution units 14A, 14B . . . 14n, the corresponding expected power consumption values in the look-up table are available to power allocation control unit 16 on signal line 24. A controller element 12 of the processor, also referred to as the scheduler/dispatcher/decoder unit, collects the expected power consumption unit values for each execution unit 14A, 14B . . . 14n being activated by the control logic. The purpose of controller element 12 is to determine which functions will be dispatched to various execution units on any given cycle. Due to the super scalar nature of current microprocessor technology, a portion of these dispatches are of a purely speculative nature. If the speculation matches the program flow, then overall throughput is increased. A plurality of execution units may be dispatched at any given time. The expected power consumption value look-up table provides an estimated power value corresponding to node toggle values for each contemplated dispatch to the execution units.

For any given cycle, controller unit 12 and all other active execution units will provide the power allocation control unit 16 macro with the current status of node toggle activity. The power allocation control macro will then sum the tabular expected power consumption values corresponding to all current activity, including active execution units, to determine whether the expected total power consumption based on battery/converter efficiency exceeds the optimum battery power efficiency value for the next cycle. If the power efficiency value has not been exceeded, then all scheduled activity may be allowed to occur. If the next cycle is expected to exceed the power efficiency value, then the amount of execution unit activity is rationed by processor ration element 20 such that the power drain will remain within the regime of optimum battery/converter efficiency.

The first units targeted or rationed are the speculative execution units, since the impact on overall operational performance is minimal. However, if turning off speculative execution units is insufficient, then other executable functions would be aborted in the order of priority associated with established program "pipeline" rules.

The level of power allocation is governed by master power allocation register 18, that may be fixed by the processor at reset, but alternatively, need not be a fixed variable. Register 18 allows the power allocation to be adjusted according to the current state of the system. If the power allocation is unlimited, then master power allocation register 18 sets a power allocation value to the maximum number of total node toggles, and execution unit activity is not curtailed. The system software is able to modify the power allocation level to the system by modifying the master power allocation register 18. As the system switches to a power optimization mode, the power allocation level is reduced within the microprocessor. This, in turn, initiates the rationing of speculative execution unit functions as necessitated to sustain the expected total power consumption level within the allotted optimum power efficiency level. Thus, the system dynamically allocates power to the system logic.

Additionally, battery efficiency is optimized and battery life is enhanced whenever load fluctuations can be kept at a minimum. Unique to this invention is the ability to dynamically maintain a constant load on the battery by sustaining a consistent number of node toggles during operation.

Although application of the present invention will typically make selected execution units inactive in order to optimize battery efficiency, it may also be necessary to add active execution units to the current operating suite during low periods of operation in order to maintain a constant or level load on the battery. One way this is accomplished is by adding nonsense opcodes to an instruction set to make up for what would otherwise be a decrease in battery demand.

Figure 2:
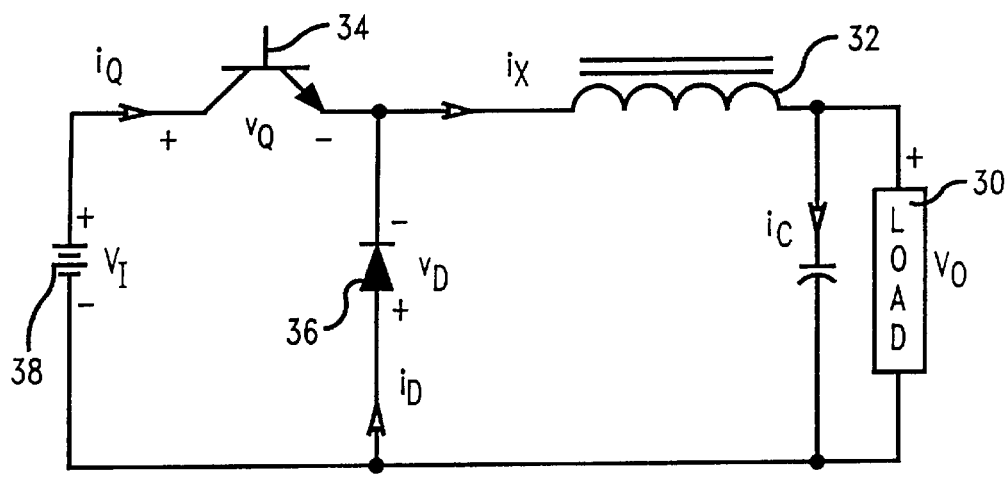
FIG. 2 is a schematic of a dc-to-dc converter.

FIG. 2 shows a dc-to-dc converter chiefly used in portable computers with a typical transformer replaced by inductor 32. Inductor 32 allows for incremental voltage step down (current step up) capability from power source 38 when transistor 34 is turned on. This incremental voltage step-up better accommodates minor change fluctuations to load 30. In personal computers, typically all of the power, except the power to the display, comes through the dc-to-dc converter. Consequently, modifying the dc-to-dc converter to be more sensitive to load change fluctuations is an effective way of maintaining level load restrictions on the battery.

Figure 3:
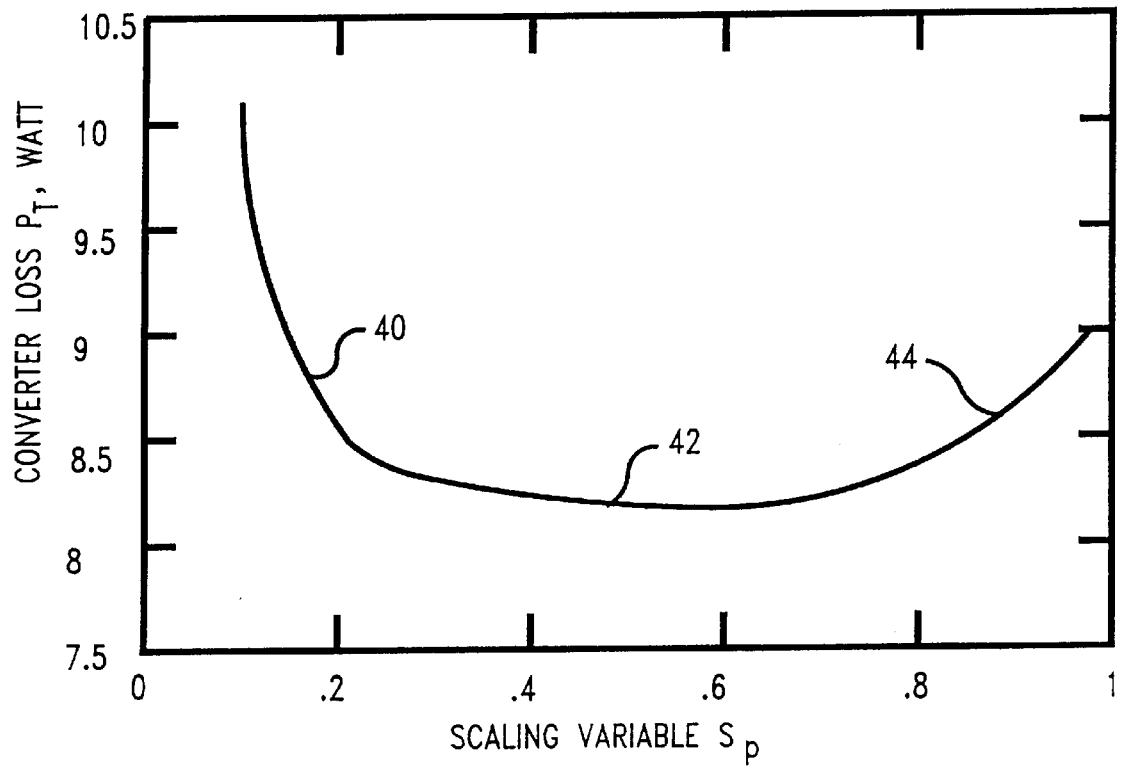
FIG. 3 is graph of dc-to-dc converter efficiency.

FIG. 3 depicts a graphical representation of the dc-to-dc converter inefficiency as a function of power delivered to the load. As shown, a relatively consistent range of converter loss 42 can be achieved as depicted over the measured power delivery scaled variable 0.2 to 0.8. Thus, by operating outside the converter loss regimes of greatest fluctuations, 40 and 44, where the rate of change of converter inefficiency varies significantly with a small change in power delivered, the optimum range of power efficiency 42 is possible when a constant load on the battery is maintained.

Figure 4:
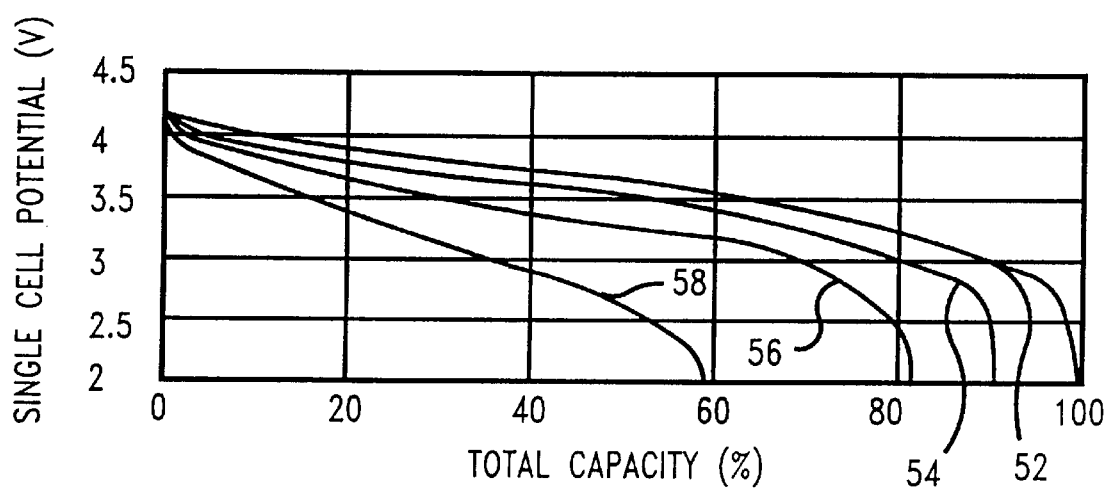
FIG. 4 is a graph of lithium ion battery discharge characteristics.

FIG. 4 shows a graphical representation of total battery capacity of a lithium-ion battery as a function of single cell potential for various discharge rates. As shown, lower discharge rates, such as that depicted by curve 52, enhances the battery's available capacity. Whereas a discharge rate of ten times the low discharge rate level, as shown in curve 58, will effectively lose up to 40% of the available battery capacity. Thus, leveling the power consumption, i.e., lowering the rate of change of discharge through constant load restrictions, will directly correspond to enhanced battery capacity.

Accordingly, the present invention provides for management of performance and power consumption in a personal computer system. Improved power conservation is realized and the battery life extended by maintaining a constant load on the battery during operation. Through execution unit monitoring, dynamic power allocation is achieved. Execution units may be canceled or nonsense operation codes employed as methods of maintaining a constant load on the battery.

Although this invention is developed to enhance the power efficiency of battery operated portable computer systems, it is also capable of being implemented in computer systems connected to a stationary power source (power outlet). The benefits of power efficiency would still be realized.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for controlling power consumption of a computer system having a plurality of execution units comprising:
    means for storing and retrieving a power efficiency value, and expected power consumption values corresponding to the plurality of execution units when said execution units are active;
    means for determining which of said execution units are currently active;
    means for calculating an approximate expected total power consumption value corresponding to said execution units when said execution units are active;
    means for comparing said expected total power consumption value to said power efficiency value;
    means for monitoring each of said execution units, and collecting said expected power consumption values;
    means for canceling operation of said active execution units responsive to said means for comparing to control power consumption of the computer system, said canceling operation based on said calculated power consumption values and said power efficiency value; and,
    means for setting a level of power allocation, wherein said power allocation correlates to said power efficiency value.

2. The apparatus of claim 1 wherein said means for canceling comprises canceling operation of said active execution units such that said expected total power consumption does not substantially exceed said power efficiency value.

3. The apparatus of claim 1 further comprising means for adding executable operation codes to said execution units such that said expected total power consumption value is sustained at approximately said power efficiency value.

4. The apparatus of claim 3 wherein said means for adding executable operation codes comprises means for adding nonsense opcodes to execution units.

5. The apparatus of claim 1 wherein said means for determining said approximate expected total power consumption value comprises means for summing said expected power consumption values corresponding to each of said active execution units.

6. The apparatus of claim 1 wherein said means for canceling operation of said active execution units comprises means for determining which of said active execution units are speculative and canceling said speculative execution units.

7. The apparatus of claim 1 further comprising a power converter and battery such that said comparing and canceling operations sustain a substantially constant load to said battery during computer operation.

8. The apparatus of claim 1 wherein said means of storing and retrieving said expected power consumption values comprises a look-up table.

9. An apparatus for controlling power consumption of a computer system having a plurality of execution units comprising:

a memory storage device, said memory device being adapted to store a power efficiency value, and expected power consumption values corresponding to said plurality of execution units;

a processor comprising a controller element, a power allocation control element, and a programmable register, and having connections to said memory storage device, said processor being adapted to determine which of said execution units are active, determine an approximate expected total power consumption value corresponding to the plurality of execution units when said execution units are active, and compare said expected total power consumption value to said power efficiency value;

said controller element of said processor being connected to and accessible by said power allocation control element, and having connections to monitor each of said execution units, said controller element being adapted to collect said expected power consumption values and cancel operation of active execution units;

said power allocation control element of said processor being connected to said controller and said programmable register, said power allocation control element being adapted to receive input data from execution units, power allocation level information from said programmable register, and expected power consumption values, and sum the total value of all expected power consumption values corresponding to active execution units to determine if power allocation based on optimum battery efficiency has been exceeded; and said programmable register of said processor being connected to said power allocation control element, wherein said register is adapted to set the level of power allocation.

10. The apparatus of claim 9 further comprising a controller element being adapted to add operational codes such that said expected total power consumption is approximately equal to said power efficiency value.

11. The apparatus of claim 9 wherein said memory storage device includes a look-up table storing said expected power consumption values.

12. The apparatus of claim 11 wherein said expected power consumption values comprises a total number of node toggles for each of said execution units.

13. The apparatus of claim 12 wherein said expected power consumption values are stored in a compressed form in said look-up table.

14. The apparatus of claim 13 wherein said compressed form of said look-up table includes an organized distribution of a small number of integer values corresponding to selected groupings of said total number of node toggles for each of said execution units.

15. The apparatus of claim 14 wherein said organized distribution of integer values comprises values in a range with limits based on multiples of two (2).

16. The apparatus of claim 9 further comprising a dc-to-dc converter modified with inductors, said dc-to-dc converter being connected to a battery.

17. A method of controlling power consumption of a computer system having a plurality of execution units comprising:

a) storing and retrieving a power efficiency value, and expected power consumption values corresponding to the plurality of execution units when said execution units are active;

b) determining which of said execution units are currently active;

c) calculating an approximate expected total power consumption value corresponding to said execution units when said execution units are active;

d) comparing said expected total power consumption value to said power efficiency value;

(e) monitoring each of said execution units, and collecting said expected power consumption values;

f) canceling operation of one or more of said active execution units responsive to said comparing of said expected total power consumption value to said power efficiency value, said canceling operation based on said calculated power consumption values and said power efficiency value; and, g) setting a level of power allocation, wherein said power allocation correlates to said power efficiency value.

18. The method of claim 17 wherein said canceling step comprises canceling operation of one or more of said active execution units when said expected total power consumption substantially exceeds said power efficiency value.

19. The method of claim 17 further comprising adding executable operation codes to said execution units such that said expected total power consumption value is sustained at approximately said power efficiency value.

20. The method of claim 19 further comprising adding nonsense opcodes to the execution units.

21. The method of claim 17 wherein said step of storing and retrieving said expected power consumption values comprises utilizing a look-up table.

22. The method of claim 21 wherein said step of storing and retrieving said expected power consumption values comprises using a compressed form look-up table of the total number of node toggles for said execution units.

23. The method of claim 22 wherein said step of retrieving of said look-up table compressed form comprises retrieving an organized distribution of a small number of values for grouping said total number of node toggles for said execution units.

24. The method of claim 23 wherein said step of retrieving of said look-up table compressed form comprises retrieving said organized distribution of a small number of values wherein said values are in a range with limits based on multiples of two (2).

25. The method of claim 17 wherein said step of determining an approximate expected total power consumption value comprises summing said expected power consumption values corresponding to each of said active execution units.

26. The method of claim 17 wherein said step of canceling operation of said active execution units comprises determining which of said execution units are speculative and canceling said speculative execution units.

27. The method of claim 17 wherein said expected power consumption values comprise the total number of node toggles for each execution unit.

28. An apparatus for controlling power consumption of a computer system having a plurality of execution units corresponding to node toggles, comprising:

means for storing and retrieving a power efficiency value, and expected power consumption values corresponding to the plurality of execution units when said execution units are active;

means for determining which of said execution units are currently active;

means for calculating an approximate expected total power consumption value corresponding to said execution units when said execution units are active;

means for comparing said expected total power consumption value to said power efficiency value;

means for monitoring each of said execution units, and collecting said expected power consumption values; and, means for adding executable operation codes to said execution units such that said expected total power consumption value is sustained at approximately said power efficiency value, and a consistent number of said node toggles is maintained.

29. A method of controlling power consumption of a computer system having a plurality of execution units corresponding to node toggles, comprising:

a) storing and retrieving a power efficiency value, and expected power consumption values corresponding to the plurality of execution units when said execution units are active;

b) determining which of said execution units are currently active;

c) calculating an approximate expected total power consumption value corresponding to said execution units when said execution units are active;

d) comparing said expected total power consumption value to said power efficiency value;

(e) monitoring each of said execution units, and collecting said expected power consumption values; and, f) adding executable operation codes to sustain a constant load of the battery when said expected total power consumption does not substantially exceed said power efficiency value, and a consistent number of said node toggles is maintained.

30. A method of controlling power consumption of a computer system having a plurality of execution units comprising:

a) storing and retrieving a power efficiency value, and expected power consumption values corresponding to the plurality of execution units when said execution units are active, wherein said storing and retrieving said expected power consumption values comprises utilizing a compressed form look-up table of the total number of node toggles for said execution units, said retrieving of said look-up table further comprises retrieving an organized distribution of a small number of values for grouping said total number of node toggles for said execution units, wherein said small number of values are in a range with limits based on multiples of two (2);

b) determining which of said execution units are currently active;

c) determining an approximate expected total power consumption value;

d) comparing said expected total power consumption value to said power efficiency value; and, e) canceling operation of one or more of said active execution units responsive to said comparing of said expected total power consumption value to said power efficiency value.

* * * * *